United States Patent
Hinkel et al.

(10) Patent No.: US 7,801,331 B2
(45) Date of Patent: Sep. 21, 2010

(54) MONITORING DEVICE

(75) Inventors: Ralf Hinkel, Horingen (DE); Klaus Borchers, Otterbach (DE)

(73) Assignee: Mobotix AG, Kaiserslautern (DE)

( * ) Notice: Subject to any disclaimer, the term of this patent is extended or adjusted under 35 U.S.C. 154(b) by 168 days.

(21) Appl. No.: 12/286,129

(22) Filed: Sep. 26, 2008

(65) Prior Publication Data

US 2009/0067674 A1 Mar. 12, 2009

Related U.S. Application Data

(63) Continuation of application No. 10/549,227, filed as application No. PCT/DE2004/000471 on Mar. 10, 2004, now abandoned.

(30) Foreign Application Priority Data

Mar. 10, 2003 (DE) .............................. 103 10 636

(51) Int. Cl.
*G06K 9/00* (2006.01)
(52) U.S. Cl. ...................... 382/103; 348/143
(58) Field of Classification Search ................ 382/100, 382/103, 107, 181, 190, 195, 204, 205, 276, 382/294, 299; 348/169, 135, 143, 144, 208.14
See application file for complete search history.

(56) References Cited

U.S. PATENT DOCUMENTS

| 5,200,818 | A | 4/1993 | Neta et al. |
| 6,011,901 | A | 1/2000 | Kirsten |
| 6,069,655 | A * | 5/2000 | Seeley et al. ................ 348/154 |
| 6,072,903 | A | 6/2000 | Maki et al. |
| 6,147,709 | A | 11/2000 | Martin et al. |
| 6,215,519 | B1 | 4/2001 | Nayar et al. |
| 6,393,144 | B2 * | 5/2002 | Rogina et al. ................ 382/154 |
| 6,810,152 | B2 | 10/2004 | Endo et al. |
| 7,023,913 | B1 * | 4/2006 | Monroe ................. 375/240.01 |
| 7,131,136 | B2 * | 10/2006 | Monroe ...................... 725/105 |
| 7,139,410 | B2 | 11/2006 | Takagi et al. |
| 7,257,236 | B2 | 8/2007 | Yukhin et al. |
| 7,319,776 | B2 | 1/2008 | Ide et al. |
| 2003/0053658 | A1 | 3/2003 | Pavlidis |
| 2003/0081813 | A1 | 5/2003 | Astle |
| 2004/0183679 | A1 | 9/2004 | Paximadis et al. |
| 2005/0146606 | A1 * | 7/2005 | Karsenty et al. ............ 348/143 |

FOREIGN PATENT DOCUMENTS

| DE | 36 40 129 | 6/1988 |
| DE | 196 39 728 | 4/1998 |
| DE | 199 56 266 | 6/2001 |
| DE | 100 42 935 | 3/2002 |
| DE | 100 49 366 | 4/2002 |
| DE | 102 61 501 | 7/2004 |
| WO | WO 02/09319 | 1/2002 |
| WO | WO 02/087218 | 10/2002 |
| WO | WO 02/093916 | 11/2002 |
| WO | WO 03/003721 | 1/2003 |

* cited by examiner

*Primary Examiner*—Anand Bhatnagar
(74) *Attorney, Agent, or Firm*—Baker & Daniels LLP

(57) ABSTRACT

The invention concerns a monitoring device with a multi-camera device and an object tracking device for the high resolution observation of moving objects. Hereby it is provided that the object tracking device comprises an image integration device for the generation of a total image from the individual images of the multi-camera device and a cut-out definition device for the definition, independent from the borders of the individual images, of the to be observed cut-out.

20 Claims, 1 Drawing Sheet

MONITORING DEVICE

CROSS-REFERENCE TO RELATED APPLICATION

Figure 1:
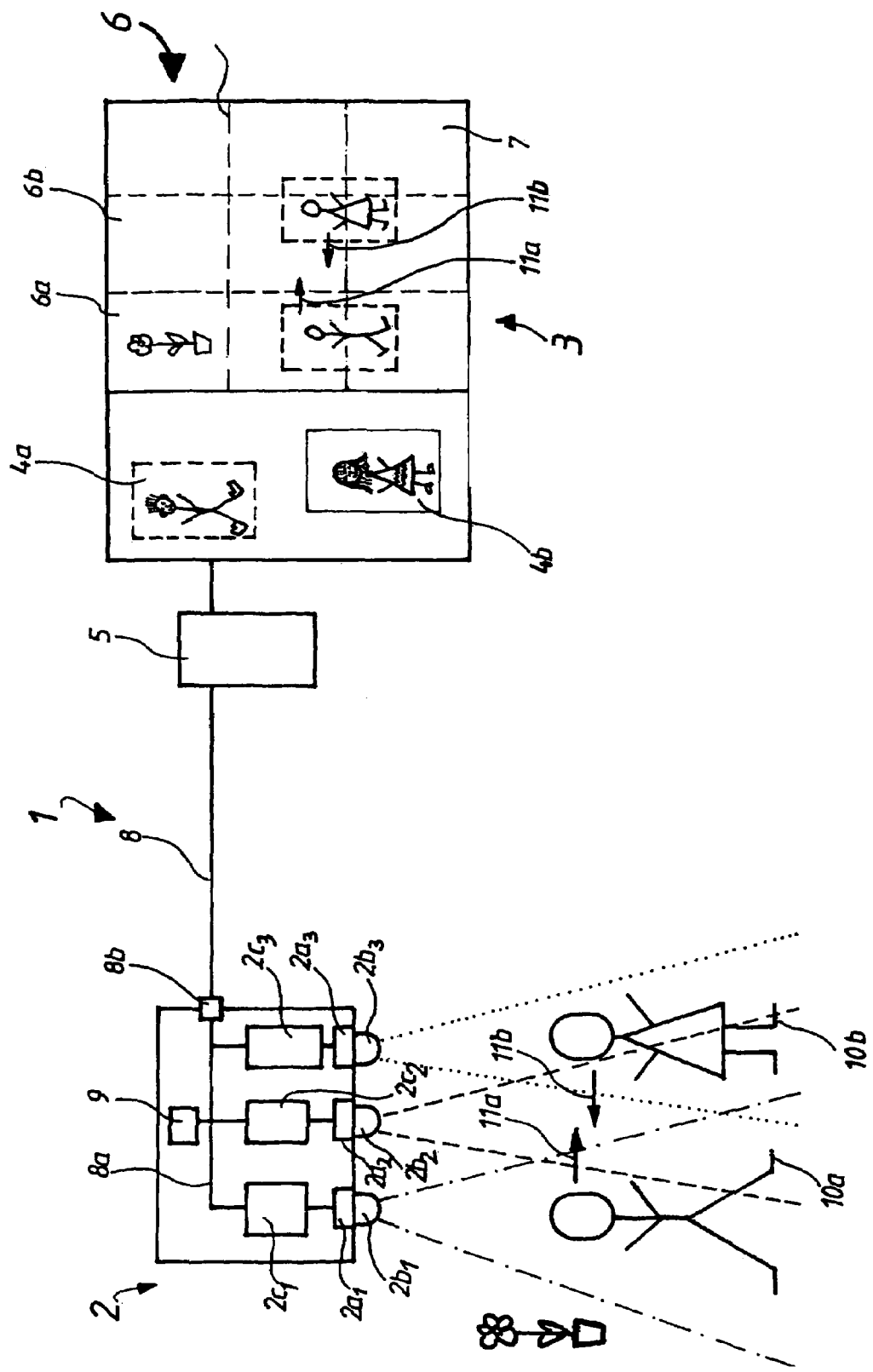

This application is a continuation of pending U.S. patent application Ser. No. 10/549,227, filed Oct. 11, 2005, entitled MONITORING DEVICE, which application is related to and claims the benefit under 35 U.S.C. §119 and 35 U.S.C. §365 of International Application No. PCT/DE2004/000471, filed Mar. 10, 2004.

The present invention concerns the preamble claim and therefore involves monitoring devices, in particular cameras.

During the observation of spaces, respectively, areas, with cameras the need often exists to accurately observe certain objects or areas while other areas are less interesting. To this end cameras are known that, on the one hand, can be aimed at a certain object and, on the other hand, whose focal length can be changed, in order to be able to observe a certain object magnified. The alignment typically takes place with electro-motive means that require an expensive mechanical device, which can bring about a corresponding wear and that correspondingly requires regular maintenance. In addition, it is not possible, when turning the camera adjusted to a longer focal length, to observe simultaneously a wide field of view. This has led previously to the development of cameras that are provided with several single cameras, in order to observe with a second camera, for example, a wide field of view. However, these cameras have the disadvantages of expensive, sluggish, and involved mechanics.

Another known realization is designed to align a system of mirrors that is placed in the optical path, with which a panoramic view is possible and to correct the image that is distorted by the mirror. Hereby is, in an obvious way, the image resolution, in particular in the strongly distorted border regions is in spite of the correction poor and observation with a higher resolution is no longer possible or useful.

Moreover, in multi-camera systems one must take care that the transfer rate does not become too high, so that not too many visual data have to be transmitted. How the transfer rate can be lowered has already been disclosed in a former patent by the applicant of the present invention. The concerned patent applications are herewith fully included for disclosure purposes.

It is desirable to provide a monitoring device that, at least partly, solves at least a part of the problem.

The task of the present invention consists in providing novelties for the commercial utilization.

The solution of this task is claimed in an independent form. Preferred embodiments can be found in the sub claims.

The present invention proposes therefore in a first main concept a monitoring device with a multi-camera device and an object tracking device for the high resolution observation of moving objects, in which it is arranged that the object tracking device contains an image integration device for the creation of a total image from the individual images of the multi-camera device and a cut-out defining device for the, independent from the borders of the individual images, definition of a cut-out that will be observed at high resolution.

A first essential aspect of the present invention therefore is that, by the arrangement of a multitude of individual cameras, whose partial images are combined into a single total image, and the arrangement of an additional device that defines which areas are observed with high resolution, independent from the borders of the individual images, a completely in electronic form realized high resolution object tracking is guaranteed, that moreover can track the single object much faster than is possible with pan-and-tilt units of a conventional fixed camera or a moveable camera that is placed in a dome housing. Furthermore, because of the multitude of individual cameras in the multi-camera device, sensors, that are of indeed high but not of the highest resolution, can be used, making possible a very economical design of the system given the present state of sensor technology.

It is possible and preferred to provide inside the multi-camera device exclusively or mainly cameras that are to a large extent identical to each other. This facilitates the access to the cameras, the development of the multi-camera device, and the subsequent maintenance. Care must only be taken that each of the, to each other identical, individual cameras observes a certain image area.

multi-camera device will comprise typical digital individual cameras, that is, for example, CCD and/or CMOS arrays or something similar. These can deliver their images in digital format. In the case of a multitude of sensors, already resolutions result with the present sate of the technology with, as an example, 1,280 horizontal dots that already with lesser sensors, for example four sensors, can no longer be meaningfully displayed on a single monitor. For this reason it is arranged that the image information of the overview image that is requested from a sensor, respectively a range of sensors, can be transmitted to the multi-camera device with reduced resolution. This lowers the network load of the image transmission when the image transmission takes place from, for example, typical LAN and/or ISDN capable camera systems. It is then worthwhile to transmit, for example, from a single sensor array at a lower resolution at times when no per se interesting object is found. However, it is preferable that every sensor array, whose area is at the time actually interesting, can be identified. Also, means to differentiate between sensors areas, for the differentiated selection of a resolution, are provided, preferably integrated in the camera itself.

The specification of which areas are to be transmitted with a higher resolution can take place in the camera itself, for example, through a per se known motion detection; hereto reference is made to aforementioned former patents of the applicant, that are, for disclosure purposes, included herein its entirety, in particular DE 102 61 501.2.

Alternatively, it is possible to provide the specification of an area that is to be transmitted at high resolution from the outside, for example, from a control station. If necessary an automatic selection can take place there as well. It be mentioned that in any case the multi-camera device can comprise data compression means for the reduction of the data transmission rate.

Preferably, the image areas of the individual cameras will at least at the borders overlap. Otherwise parts of the observed space, if necessary however only as very narrow bands, can remain unobserved. It be mentioned that an overlapping can vary from multi-camera device to multi-camera device. Thus, the installation of the individual cameras can take place without high precision, for example, by gluing the individual cameras, and it is then only ensured that the creation of a total image incorporates the overlapping correctly for the corresponding individual case. Relevant calibration information can, for example, be placed in the multi-camera device, in order to make a precise and exact image reproduction possible, independent from the respective control station and with information that is available there. Also, autodidactic software on the multi-camera device, or a control station that is connected to it, can be used.

It can be preferable that, if the overlapping of the image areas is selected in such a way, that each spatial area is observed by at least two cameras, at least in critical areas such as doors, bank counters, and the like. In this way a greater reliability of the total system in case of camera failure is achieved.

The individual cameras may differ from each other in the way that they create an image. In particular, it is possible to provide every sensor with an automatic exposure appropriate to the lighting conditions of the spatial area that it observes. In this way a first sensor can be aimed at a very dark, not illuminated spatial area, and can accordingly be adjusted to be more sensitive, while another sensor observes a brightly illuminated area of the same space. The image integration device is preferably constructed to correct, preferably automatically, for such differences, in as far as that does not take place in the multi-camera device. If required, status information concerning current illumination information, etc., for the correction, can be transmitted together with the image.

Furthermore, it be pointed out that typically the monitoring device will be coupled to a total image display, which has a typical lower resolution as the one that results from the maximal possible combined resolution of the individual image cameras. Preferred detail cut-out display means are then provided that depict detailed information of certain, selected areas. This detail cut-out display can be designated as image cut-out to one and the same monitor and/or it can be assigned to separate monitors.

It be also pointed out that a motion detection is possible that in the cameras themselves detects pronounced image changes, in order to define interesting image cut-outs. Furthermore, it is possible for a user to focus on per se interesting areas, that is, image cut-outs that must be displayed principally and/or continuously and/or rather more detailed, for example, the area close to a bank counter or something of a similar kind. It can be preferred, in particular when the image data will be stored, to make the interesting image areas variable in time, in order to observe approximately during those times at which, for example, a bank counter is open, other areas than at those times during which, for example, cleaning crews are active or a building per se is closed. In this way windows and the like can be observed in detail, for example, outside building opening times. It be mentioned that the specification of image cut-outs that will be observed in detail is also possible through the current evaluation of external sensor sources such as microphones, glass breaking sensors, door opening sensors, fire sensors, and smoke sensors, etc. It be also mentioned that a statistical analysis concerning the frequency of interesting image changes can be consulted alone and/or in combination with other information, in order to determine and/or exclude interesting image areas for detailed observation. Likewise, it be mentioned that an area transfer or the notification of an object that moves can be transmitted from one camera to the next. In this way, for example, when in an image sensor a large change has occurred and the object that causes the image change moves towards another sensor, a corresponding signal can be passed from the camera, to which the first sensor belongs, to the camera to which the second sensor belongs, so that a continuous observation of the interesting object becomes possible with higher resolution and/or is avoided, and that objects, already identified as uninteresting, can be further followed. Likewise, it be mentioned that through the evaluation of external sensors sound locating can take place, directional microphones can track and/or several microphones can be evaluated.

Furthermore, it be mentioned that it is possible to mask out certain areas as uninteresting and/or as not observable. In this way it can be assured that the privacy of persons who have to move frequently through the image area, but who per se must not be observed, is guaranteed, without that corresponding blinds or something similar have to be mounted. It can here also involve a complete masking, respectively shadowing, which is, for example, useful when cameras such as Web cameras of unknown users will be addressed. Likewise, it be mentioned that an additional correction, through the utilization of the overlapping image areas, is possible. Furthermore, it be realized that, if necessary, then when a very high cost is permissible, in addition a moveable camera can be provided, in order in addition to observe with extremely high resolution an area. In such a case, first an area that is particularly interesting can be determined with the multi-camera device, and it can then be achieved, through the tracking with the moveable camera, that images of the area marked as interesting will be received with a yet higher resolution.

The invention is explained in the following only as an example with the aid of the described drawing. In this depicted is:

FIG. 1 a representation of a monitor device according to the invention.

According to FIG. 1 the monitoring device 1, in general denoted with 1, comprises a multi-camera device 2 and an object tracking device 3 for the high resolution observation of moving objects, in which it is arranged that the object tracking device 3 contains an image integration device 5 for the creation of a total image 6 from the individual images 6a, 6b, etc., of the multi-camera device and a cut-out defining device 7 for the definition, independent from the borders of the individual images, of cut-outs 4a, 4b that will be observed at high resolution.

The monitoring device 1 serves in the present example to observe the public area of a banking hall and comprises two, through a conventional computer network cable (LAN) 8 connected, areas, namely, on the one hand, the banking hall in which the multi-camera device 2 is arranged, and, on the other hand, a control station area where the observation of the banking hall takes place and in which the object tracking device 3 is arranged.

The multi-camera device 2 comprises in the present example an array of 3×3 individual cameras, each with CCD arrays 2a and comprising a projection optics 2b as well as an evaluation circuit 2c for each individual camera. The evaluation units 2c are connected to each other via a bus system 8a inside the multi-camera device and through the cable 8 to the control station via similar plug-and-socket arrangements 8b. In addition a communication control unit 9 is connected to the bus 8a for controlling the communication between the individual cameras and for communication via the cable 8 with the control station.

The various CCD sensors 2a1, 2a2, etc., are identical to each other and provide a solution, as they are readily available and economical. The sensors and optics 2a, 2b are oriented with respect to each other in such a way that the spatial areas that are obtained from an individual camera overlap. This is in each case clearly illustrated, by dot and dash, broken, and dotted lines, in the depicted layout by means of the overlap of the fields of view originating from the optics 2b1, 2b2, 2b3. The optics 2b is immobile and economical. The overlapping areas of these optics are, as is obvious in the FIGURE, not identical, that is, the width of overlapping of the optics 2a1 and 2a2 is different from the width of the overlapping of the optics 2a2 and 2a3.

The sensors 2a1, 2a2, 2a3, etc., can be read with different sensitivity by their evaluation circuit 2c1, 2c2, 2c3, etc., in order that without problems a response to a brightness difference of an adjacent area of view is possible, so that, at that time, an adequate sensitivity can be chosen.

The evaluation circuit 2c is designed to condition the image data received from the sensor 2a and, as is required for the transmission, to reduce them. For disclosure purposes be it referred to the data reduction possibilities according to the aforementioned applications. The evaluation circuit 2c is moreover in particular designed to send image data, of the area parts of the designated sensor array with a higher compression and data of other area parts of the sensor array without compression, over the cable 3 through the internal bus 8a and the interface 8b. Furthermore, each unit 2c is designed to capture motions of objects 10 inside its designated sensor view array and to define a motion cut-out and to determine the direction of motions. Furthermore, it is designed to transmit to the unit 9 motions in directions towards the sensor borders and to receive from it corresponding information. Such motions of objects 10a, 10b are depicted in the FIGURE by arrows 11a, 11b.

The object tracking device 3 in the monitoring control station comprises a display that, on the one hand, can display a total image that is composed from the individual images 6 of the cameras in the multi-camera device 2, whereby the display for the reception of the total images is connected to an image integration device 5, and on the other hand, with which the, likewise from the image integration device 5 received and with the cut-out definition device 7 defined, cut-outs 4a, 4b can be displayed with high resolution. The display device could be a conventional, high resolution computer monitor.

In the total overview, that only has fewer details, the individual images 6a, 6b are not different and/or isolated from each other. The dot and dash line 12 only serves for visualization during the clarification of the invention. As is obvious, the overlapping areas are only simply represented, thus do not show up twice, even though they are captured by several cameras. The object tracking device 3 accordingly is designed in such a way that a continuous, overlap free image results. Hereto a stage can be provided in which the overlap area is cut.

The cut-outs 4a, 4b are in the present example placed around two moving persons 10, 10b and, as is clear, the cut-outs are displayed with higher resolution on a part of the monitor's screen. Alternatively, a display on a separate monitor is also possible. In the case of a multi monitor system they can be connected to one and the same computer. Alternatively, it is possible to route to a dedicated monitor by providing a certain local intelligent signal directly to the display of the cut-outs that are to be observed locally.

The image integration device 5 consists in the present case of a PC, that is fed via a LAN connection 8 the individual camera images that have reduced resolution as well as reduced data. In this context be it mentioned that by "individual camera image" an image, respectively an image sequence, can be meant, in particular in case of a sequential transmission of image areas, that only change little, of a single camera, for example, an individual camera of the sensor 2a2, as in the referred to application of the inventor/applicant. The integration of the, if necessary, with little time delay sequentially transmitted images from the different individual cameras with the image integration device 5 is moreover advantageous, in order to keep the data transmission rate on the network 8 low and it thus makes possible in particular a precise remote observation via ADSL, ISDN, or the like.

The total image 6 is built, as mentioned before, from the individual images 6a, 6b, etc.

As cut-out definition device 7 serves initially a touch sensitive area of the display area, on which the total image is displayed and on which a user can mark with the finger or an appropriate object a momentarily relevant area. In the depicted example two of such areas 4a and 4b are marked. Alternatively, for the cut-out definition also an automatic evaluation can take place in the image integration device 5 or the communication control unit 9, for example, by taking into consideration image areas of individual cameras that recently have changed considerably, areas of the total images, etc., and/or by taking into account particularly interesting or less interesting areas, such as decoration areas 6a. In the case of automatic selection and/or object tracking information concerning the current particular high resolution areas can be made available on the cable 8 by the communication control unit 9.

The transmission cables 8 are conventional transmission cables that, however, implicitly may not and/or shall not be loaded with the data rate of the fully resolved individual images.

Via the cable 8 bidirectional communication can take place, that is, on the one hand, image data and/or other data such as control information, tone signals, etc., can be transmitted from the multi-camera device 2 to the image integration device 5, and, on the other hand, control signals from the image integration device 5 can be transmitted, concerning in particular those areas that a user, according to a, with the cut-out definition device 7 made-up cut-out definition, wants to display with high resolution.

The communication control unit 9 is designed to evaluate the single image data obtained from the evaluation circuit 2c in particular concerning the there detected motion of objects, in order to, when an object that has to be represented with high resolution oversteps an image boundary, automatically transmit a message to every neighboring individual camera of the multi-camera device 2, with which the moving object will be captured as the next view of the observed motion, as is represented by arrow 11a or 11b.

With an arrangement according to the present invention an observation takes place as follows:

First the multi-camera device 2 is assembled with a multitude of identical cameras without an expensive alignment taking place during the assembly. Then the multi-camera device 2 is mounted in the area that has to be observed, and namely in such a way that it captures with the individual cameras the whole interesting spatial area. After this mounting and the one-time alignment the multi-camera device 2 is fixated so that subsequently all cameras continuously will observe an in every case fixed area. Now the multi-camera device 2 is connected to the cable 8 and at first a learning phase is started, in which through the evaluation of image signals it is ensured that objects that occur in the overlapping image areas, are represented only once in the total image. This can take place in an autodidactic manner with pattern recognition and/or through a calibration phase with known patterns, if necessary, a calibration before mounting is possible in the manufacturing process.

Now the monitoring device is prepared for operation. In the case that the observed area is empty at first, there is no need to demand data with a high resolution from one of the sensors and all sensors supply at first images with a lower resolution that are combined with an image integration device 5 into a total image.

If subsequently objects enter the observed area, here represented by two persons 10a, 10b, then an observer in the control station can create on the area of a touch sensitive monitor 7 that displays the total image 6, a corresponding marking and thereby demand high resolution images of the persons. The areas that should be displayed at high resolution are demanded via the cable 8 independently of the borders of the individual images and are by means of the borders of the image area, that is to be transmitted at high resolution, assigned by the communication control unit 9 to the individual cameras. These are informed that an area and which area inside the respective sensor array is to be transmitted at high resolution and thereupon the camera issues, in a manner organized by the communication control unit 9 the corresponding data at high resolution on the internal cable 8a, while the image data of the irrelevant areas of the respective sensors are transmitted from there with lower resolution. It is then possible to obtain in addition a total image that represents the total spatial area, whereby the image integration stage 5 for the now at high resolution transmitted areas on the one hand carries out an averaging for the display of the total image and at the same time the areas that are to be displayed with high resolution are displayed on a separate image cut-out with greater detail.

Because the arrangement can achieve merely by transmission of electronic control signals an increase of the image resolution for certain areas, the total arrangement is very fast. Thus, very quick switching between objects is possible, if necessary, also automatically.

It be pointed out that an automatic generation of relevant image areas, an automatic tracking according to motion detection, etc., are likewise possible.

While it was described in the preceding that integration takes place in an image integration stage 5 that is separated from the multi-camera device 2 via a LAN cable, it is also possible to already provide the multi-camera device with an image integration means. This is above all then useful when the communication control unit 9 is constructed as an adequate control capable digital circuit and that can take on the task of the image integration. This is then advantageous when the multi-camera device in any case must provide an image that is compatible with standard browsers. Moreover, an image comparison of the individual cameras for the compensation of a possible image intersection is then already independently possible with the LAN connection of the multi-camera device. If desired, thereby either a cut-out choice can be made-up by the user and transmitted to the multi-camera device 2 and/or an automatic choice takes place in the multi-camera device 2, in particular in a processor circuit that implements if possible the communication control unit 9 and the image integration stage 5 in an integrated manner.

An image compression, dependent on the position and motion of different resolution stages, can be produced, whereby then, for example, image areas that are in the in the multi-camera device 2 identified as uninteresting during magnification of the total image and/or cut-out choice, which can in particular take place on the receiver side, can be displayed blurred, but interesting image areas, thanks to the detailed data, sharp. It is here in particular pointed to the possibility to generate total images, for example, from tiles with different resolutions, respectively accuracy of detail. It be mentioned that an embedding of the areas that are transmitted with a higher accuracy of detail can also take place at the receiver side.

The invention claimed is:

1. Apparatus for surveillance and object tracking, comprising:
    a control station;
    a remote set of a plurality of digital cameras;
    an image data combination and compression means for providing image data via a bidirectional network having a limited bandwidth to said control station;
    the apparatus being adapted to provide, via the bidirectional network, from the remote set of the plurality of cameras to said control station first image data as an overall image of a scene to be surveyed, corresponding to a combination of image data from a plurality of the cameras and having a resolution reduced to a value below the maximum resolution possible for a given camera of the plurality of cameras by said image data combination and compression means;
    the apparatus being further adapted to transmit from the control station via the bidirectional network to the remote set of the plurality of cameras and the image data combination and compression means information defining a section of the overall image containing an object to be tracked within the overall scene and to provide second image data corresponding to the section of the overall image, the section of the overall image being independent of image boundaries of single cameras of the plurality of cameras and having a resolution higher than the resolution of the first image data,
    so as to provide a highly resolved image of the object to be tracked within the image data quickly without overburdening the bidirectional network having a limited bandwidth.

2. The apparatus of claim 1, wherein the remote set of cameras includes a plurality of cameras that are identical to each other.

3. The apparatus of claim 2, wherein the remote set of cameras includes digital cameras.

4. The apparatus of claim 2, wherein the remote set of cameras is adapted to provide at least two different resolutions.

5. The apparatus of claim 2, wherein the remote set of cameras is adapted to provide resolutions that are different for certain areas.

6. The apparatus of claim 1, wherein the remote set of cameras includes digital cameras.

7. The apparatus of claim 6, wherein the remote set of cameras is adapted to provide at least two different resolutions.

8. The apparatus of claim 6, wherein the remote set of cameras is adapted to provide resolutions that are different for certain areas.

9. The apparatus of claim 1, wherein the remote set of cameras is adapted to provide at least two different resolutions.

10. The apparatus of claim 9, wherein the remote set of cameras is adapted to provide resolutions that are different for certain areas.

11. The apparatus of claim 1, wherein the remote set of cameras is adapted to provide resolutions that are different for certain areas.

12. The apparatus of claim 11, wherein the apparatus is adapted to specify for an external source and/or in advance the images of which areas should be transmitted at certain resolutions.

13. The apparatus of claim 1, wherein the apparatus is adapted to align individual cameras with respect to each other in such a way that their image areas overlap.

14. The apparatus of claim 1, wherein the apparatus is adapted such that, at least in part of the central area of the total image field, a complete overlapping of image areas of the individual camera image areas is given so that every image area inside the central area is captured by at least two individual cameras.

15. The apparatus of claim 1, wherein individual ones of the cameras are individually mounted.

16. The apparatus of claim 1, wherein a total image display is provided.

17. The apparatus of claim 1, wherein a detail section display is provided.

18. The apparatus of claim 1, wherein motion detection is provided.

19. The apparatus of claim 1, wherein an area of selection device is provided for the automatic selection of an area that is to be displayed with high resolution and/or is to be observed.

20. The apparatus of claim 1, wherein an area selection device is provided for the selection of areas that are to be observed with high resolution in response to a motion detection signal from a motion detection device.

* * * * *